UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

1,016,604.     Specification of Letters Patent.     Patented Feb. 6, 1912.

No Drawing.    Application filed December 14, 1909. Serial No. 533,106.

*To all whom it may concern:*

Be it known that I, OSCAR BALLY, Ph. D., chemist, a citizen of the Swiss Republic, residing at Mannheim, Germany, have invented new and useful Improvements in Anthracene Dyes and Processes of Making and Using Same, of which the following is a specification.

I have discovered that halogenated ketones can be treated with amino compounds of the anthraquinone series giving rise to coloring matters which dye vegetable fiber from a vat. Under the term halogenated ketones I include ketones of the general formulæ H—R—CO—R—Hl and Hl—R—CO—CO—R—Hl (in which Hl represents a halogen. atom and R represents an unsubstituted or substituted aromatic or aliphatic residue), and also halogen derivatives of phenanthrene-quinone, which can itself be regarded as a cyclic alpha diketone.

The new coloring matters which can be obtained according to my invention contain one or more anthraquinone residues coupled to the ketone by means of an imino group or imino groups. For instance, if amino halogen phenanthrene-quinone be combined with one molecular proportion of an amino-anthraquinone, a condensation product is obtained containing one anthraquinone residue and one phenanthrene-quinone residue, whereas dihalogen phenanthrene-quinone can combine either with one molecular proportion, or with two molecular proportions, of amino-anthraquinone. On the other hand, a di-amino-anthraquinone can react either with one molecular proportion, or with two molecular proportions, of halogen phenanthrene-quinone.

My new coloring matters possess the following properties. They consist, when dry, of dark powders; they are soluble in concentrated sulfuric acid with a violet to brown to green color, and in fuming sulfuric acid with a green to blue color; they yield from brown to red solutions in nitrobenzene, and they dye cotton from a vat red to violet shades.

My new coloring matters are much more readily soluble in boiling nitrobenzene than are the coloring matters described in Patent No. 863,397, being soluble to the extent of about one, or more, parts per thousand.

The following are examples of how my invention can be carried into practical effect, but my invention is not confined to these examples. The parts are by weight.

Example 1: Boil together ten parts of 4.4′-dichlor-benzophenone, twenty parts of 1-amino-anthraquinone, fifteen parts of anhydrous sodium acetate, three parts of cuprous chlorid, and three hundred parts of nitrobenzene. When the formation of the coloring matter is complete, allow the mixture to cool, filter off the reaction product, and wash it, first with nitrobenzene, and then with alcohol.

Example 2: Boil together twenty-five parts of dichlor-acetophenone $$(4)\,Cl.C_6H_4.CO.CH_2Cl,$$

fifty parts of 1-amino-anthraquinone, ten parts of calcined soda, one part of copper oxid, and seven hundred and fifty parts of nitrobenzene, until the color of the melt no longer changes. Work up the product as described in the foregoing Example 1.

Example 3: Boil together fifty parts of 4.4′-dichlor-benzil, one hundred parts of 1-amino-anthraquinone, twenty parts of calcined soda, two parts of copper oxid, and fifteen hundred parts of nitrobenzene. When the reaction is complete, work up the product as described in the foregoing Example 1. It is thus obtained in the form of small brown crystalline needles.

Example 4: Boil together, for a few hours, three parts of monobrom-phenanthrene-quinone, two and two-fifths parts of 1-amino-anthraquinone, two parts of calcined soda, one-fifth of a part of copper oxid, and one hundred and fifty parts of nitrobenzene. When the mixture is cold, filter off the condensation product, and wash it with alcohol. In the dry state it is a violet-brown powder which is insoluble in water, alkalis, and dilute acids. In concentrated sulfuric acid it yields a brown-olive solution which, upon being warmed with the addition of boric acid, becomes violet-brown. It is difficultly soluble in organic solvents of high boiling point, yielding a red solution.

Example 5: Boil together four and four-fifths parts of monobrom-phenanthrene-quinone, two parts of 1.5-diamino-anthraquinone, three parts of sodium acetate, one-fifth of a part of cuprous chlorid, and one hundred and fifty parts of nitrobenzene. When the condensation is complete, work up the reaction product in the manner described in the foregoing Example 4. It is a dark powder which yields a brown solution in concentrated sulfuric acid and a dull green solution in warm sulfuric acid to which boric acid has been added. It is very difficultly soluble in organic solvents, and colors them red.

Example 6: Boil together five parts of dibrom-phenanthrene-quinone (of a melting point of two hundred and eighty-four, to two hundred and eighty-six, degrees centigrade), ten parts of 1-amino-anthraquinone, two parts of calcined soda, one-fifth of a part of copper oxid, and one hundred and fifty parts of nitrobenzene. When the condensation is complete, filter off the reaction product and wash it with alcohol, and dry it. It is a brown crystalline powder and yields a violet solution in concentrated sulfuric acid. This solution becomes blue on the addition of boric acid.

Example 7: Boil together, for about six hours, three parts of dichlor-phenanthrene-quinone (obtainable by chlorinating phenanthrene-quinone in the presence of a halogen carrier), four and nine-tenths parts of 1-amino-anthraquinone, three parts of calcined soda, one-fifth of a part of copper oxid, and one hundred and fifty parts of nitrobenzene. The product obtained, after having been isolated in the manner described in the foregoing Examples 4, 5, and 6, yields a brownish olive solution in concentrated sulfuric acid, which solution, on the addition of boric acid and on being warmed, turns bordeaux.

In a similar manner, other halogenated ketones and diketones of the aforesaid types can be employed, and, instead of 1-amino-anthraquinone, other amino compounds of anthraquinone can be used and the nitrobenzene can be replaced by any other suitable indifferent solvent. Further the cuprous chlorid and copper oxid can be replaced by other compounds which promote the reaction.

The following table gives a few of the properties of some of the coloring matters obtainable according to my invention:—

| Condensation product from— | Color of the solution in— | | |
|---|---|---|---|
| | Nitrobenzene. | Conc. sulfuric acid. | Fuming sulfuric acid. |
| 4.4'-dichlor-benzophenone+1-amino-anthraquinone | Easily soluble. Yellowish red. | Olive-green | Bright green. |
| 4.4'-dichlor-benzophenone+1.5-diamino-anthraquinone | Soluble warm. Blue-red | Brown | Bottle-green. |
| 4.4'-dichlor-benzophenone+1.8-diamino-anthraquinone | Soluble warm. Blue-red | Red-brown | Olive-green. |
| Tetrachlor-benzophenone+1-amino-anthraquinone | Difficultly soluble. Yellow-brown. | Olive-brown | Bright green. |
| 3.3'-dibrom-benzophenone+1-amino-anthraquinone | Easily soluble. Red | Olive-green | Blue-green, turns violet-blue on standing. |
| 1².4-dichlor-acetophenone+1-amino-anthraquinone | Easily soluble. Red | Brown | Dirty green. |
| 4.4'-dichlor-benzophenone+1-amino-6-chlor-anthraquinone | Easily soluble. Red | Bottle-green | Bottle-green. |
| 4.4'-dichlor-benzil+1-amino-anthraquinone | Soluble warm. Red-brown | Olive | Green-blue. |

In order to dye with the product of the foregoing Example 1, dissolve half a kilogram thereof in one thousand liters of water, add five liters of twenty-four per cent. caustic soda solution, and from ten, to fifteen, liters of a twenty per cent. hydrosulfite solution, and work the vegetable fibrous material in this bath for from thirty, to forty-five, minutes, at a temperature of from forty, to sixty degrees centigrade. Then wash well and finish off in the usual manner. By the addition to the bath of from twenty-five, to fifty, kilograms of common salt, or of Glauber salt, the degree of exhaustion is increased. The shades produced are pure bluish red. The other coloring matters produced according to this invention can also be dyed in a similar manner, and all the coloring matters can be used for padding and printing in the manner usually employed with vat coloring matters. They give rise to shades varying between red and violet.

Now what I claim is:—

1. The process of producing coloring matter of the anthracene series by condensing with an amino compound of the anthraquinone series a halogenated ketone of a constitution corresponding to the formula Hl—R—CO—R—Hl, where Hl represents halogen and R represents a hydrocarbon radical.

2. The process of producing coloring matter of the anthracene series by condensing 4.4'-dichlor-benzophenone with 1-amino-anthraquinone.

3. As new articles of manufacture the coloring matters of the anthracene series which can be obtained by condensing a halogenated ketone with an amino compound of the anthraquinone series, which coloring matters consist when dry of dark powders, are soluble in concentrated sulfuric acid with a violet to brown to green color and in fuming sulfuric acid with a green to blue color, and yield from brown to red solutions in nitrobenzene, and which dye cotton from the vat red to violet shades and which are soluble in boiling nitrobenzene to the extent of about one part, or more, per thousand.

4. As a new article of manufacture the coloring matter of the anthracene series which can be obtained by condensing 4.4'-dichlor-benzophenone with 1-amino-anthraquinone, which coloring matter consists when dry of a dark powder; it is soluble in concentrated sulfuric acid with an olive-green color and in fuming sulfuric acid with a bright green color, it is easily soluble in nitrobenzene yielding a yellowish-red solution, and it dyes cotton from a vat pure bluish red shades.

In testimony whereof I have hereunto set my hand in the presence of two subscribing witnesses.

OSCAR BALLY.

Witnesses:
 J. ALEC. LLOYD,
 W. W. SCHMIDT.